(12) United States Patent
Hessling et al.

(10) Patent No.: US 12,540,584 B2
(45) Date of Patent: Feb. 3, 2026

(54) SYSTEM AND METHOD OF OPERATING ENGINES OF WORK MACHINES

(71) Applicant: Caterpillar Inc., Peoria, IL (US)

(72) Inventors: John Bernard Hessling, Marquette Heights, IL (US); Richard Lane Fulcher, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 113 days.

(21) Appl. No.: 18/650,250

(22) Filed: Apr. 30, 2024

(65) Prior Publication Data
US 2025/0334083 A1 Oct. 30, 2025

(51) Int. Cl.
F02D 41/02 (2006.01)
F16H 59/40 (2006.01)
F16H 61/04 (2006.01)
B60W 30/188 (2012.01)
F16H 59/46 (2006.01)

(52) U.S. Cl.
CPC ..... F02D 41/0205 (2013.01); F02D 41/0215 (2013.01); F16H 59/40 (2013.01); F16H 61/0403 (2013.01); B60W 30/1884 (2013.01); F02D 41/0225 (2013.01); F02D 2200/50 (2013.01); F16H 59/46 (2013.01); F16H 2061/0488 (2013.01)

(58) Field of Classification Search
CPC ................ B60W 30/1884; F16H 59/46; F16H 2061/0488; F02D 41/0225
See application file for complete search history.

(56) References Cited

U.S. PATENT DOCUMENTS

| | | | |
|---|---|---|---|
| 5,323,667 A * | 6/1994 | Tweed | F02D 31/007 477/122 |
| 8,401,753 B2 | 3/2013 | Chappell et al. | |
| 8,510,002 B2 | 8/2013 | Sakai et al. | |
| 8,700,276 B2 | 4/2014 | Velde et al. | |
| 10,883,255 B2 | 1/2021 | Legner | |
| 11,591,774 B2 | 2/2023 | Koenig et al. | |

* cited by examiner

Primary Examiner — Derek D Knight

(57) ABSTRACT

A method of operating an engine of a work machine, via a controller, includes detecting a request for a transmission shift of a transmission of the work machine from a neutral gear to a desired starting gear; determining a current transmission output speed of the transmission; determining a desired transmission output speed of the transmission corresponding to the desired starting gear; determining a desired minimum speed of the engine based on a difference between the current transmission output speed and the desired transmission output speed; and causing, based on the request for the transmission shift, the engine to operate at or above the desired minimum speed prior to a completion of the transmission shift from the neutral gear to the desired starting gear.

20 Claims, 4 Drawing Sheets

SYSTEM AND METHOD OF OPERATING ENGINES OF WORK MACHINES

TECHNICAL FIELD

The present disclosure relates to work machines, such as a motor grader, applied in earth work operations, and, more particularly, to a system and a method of operating an internal combustion engine of a work machine in response to launching the work machine directly into a high-speed starting gear.

BACKGROUND

A work machine, such as a motor grader or a loader, applicable in construction and mining environments, typically includes a transmission that transfers rotational power from a power source (e.g., an internal combustion engine) of the machine to one or more traction devices of the machine. In so doing, the transmission helps attain machine motion. It is common for such transmissions to be switched between multiple gears (e.g., a neutral gear, forward gears, and reverse gears) to suitably allow the machine to travel at different speeds.

If a launch (or acceleration) of the work machine into an alternate high-speed starting gear (e.g., a fourth gear) instead of a standard low-speed starting gear (such as, a first gear, or a second gear, or a third gear) is attempted, while the engine is operating at or around its minimum idle speed, a surge in a driveline load may be experienced by the engine. Such a surge in the driveline load may cause the engine to lug or stall.

U.S. Pat. No. 11,591,774 discloses a system and method for compensating reduced track speed because of engine droop for a work machine. The system includes a frame, an attachment coupled to the frame, a ground-engaging mechanism adapted to support the frame, an engine, a motor, a track speed sensor, an engine speed sensor, and a controller. The engine may drive the ground-engaging mechanism and attachment. The engine may be coupled through a variable speed transmission to the ground-engaging mechanism and the attachment. The variable speed transmission may include a hydrostatic circuit. The controller may be adapted to send an increased transmission command signal based on a drop in the engine speed signal when the work machine engages an increased load. The increased transmission command signal may increase a motor speed to cause an increase in track speed to compensate at least a portion of the reduced track speed from the engine speed droop.

SUMMARY OF THE INVENTION

In one aspect, the disclosure relates to a method of operating an engine of a work machine, via a controller. The method includes detecting a request for a transmission shift of a transmission of the work machine from a neutral gear to a desired starting gear. Further, the method includes determining a current transmission output speed of the transmission. In addition, the method includes determining a desired transmission output speed of the transmission corresponding to the desired starting gear. Further, the method includes determining a desired minimum speed of the engine based on a difference between the current transmission output speed and the desired transmission output speed. Furthermore, the method includes causing, based on the request for the transmission shift, the engine to operate at or above the desired minimum speed prior to a completion of the transmission shift from the neutral gear to the desired starting gear.

In another aspect, the disclosure relates to a work machine. The work machine includes an engine, a transmission operably coupled to the engine to transfer power to one or more traction devices of the work machine to facilitate machine motion, and a control system for operating the engine. The control system includes a controller. The controller is configured to detect a request for a transmission shift of the transmission from a neutral gear to a desired starting gear. The controller is further configured to determine a current transmission output speed of the transmission. Also, the controller is configured to determine a desired transmission output speed of the transmission corresponding to the desired starting gear. Further, the controller is configured to determine a desired minimum speed of the engine based on a difference between the current transmission output speed and the desired transmission output speed. Furthermore, the controller is configured to cause, based on the request for the transmission shift, the engine to operate at or above the desired minimum speed prior to a completion of the transmission shift from the neutral gear to the desired starting gear.

In yet another aspect, the disclosure relates to a control system for operating an engine of a work machine. The control system includes a controller. The controller is configured to detect a request for a transmission shift of a transmission of the work machine from a neutral gear to a desired starting gear. The controller is further configured to determine a current transmission output speed of the transmission. Further, the controller is configured to determine a desired transmission output speed of the transmission corresponding to the desired starting gear. In addition, the controller is configured to determine a desired minimum speed of the engine based on a difference between the current transmission output speed and the desired transmission output speed. Furthermore, the controller is configured to cause, based on the request for the transmission shift, the engine to operate at or above the desired minimum speed prior to a completion of the transmission shift from the neutral gear to the desired starting gear.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
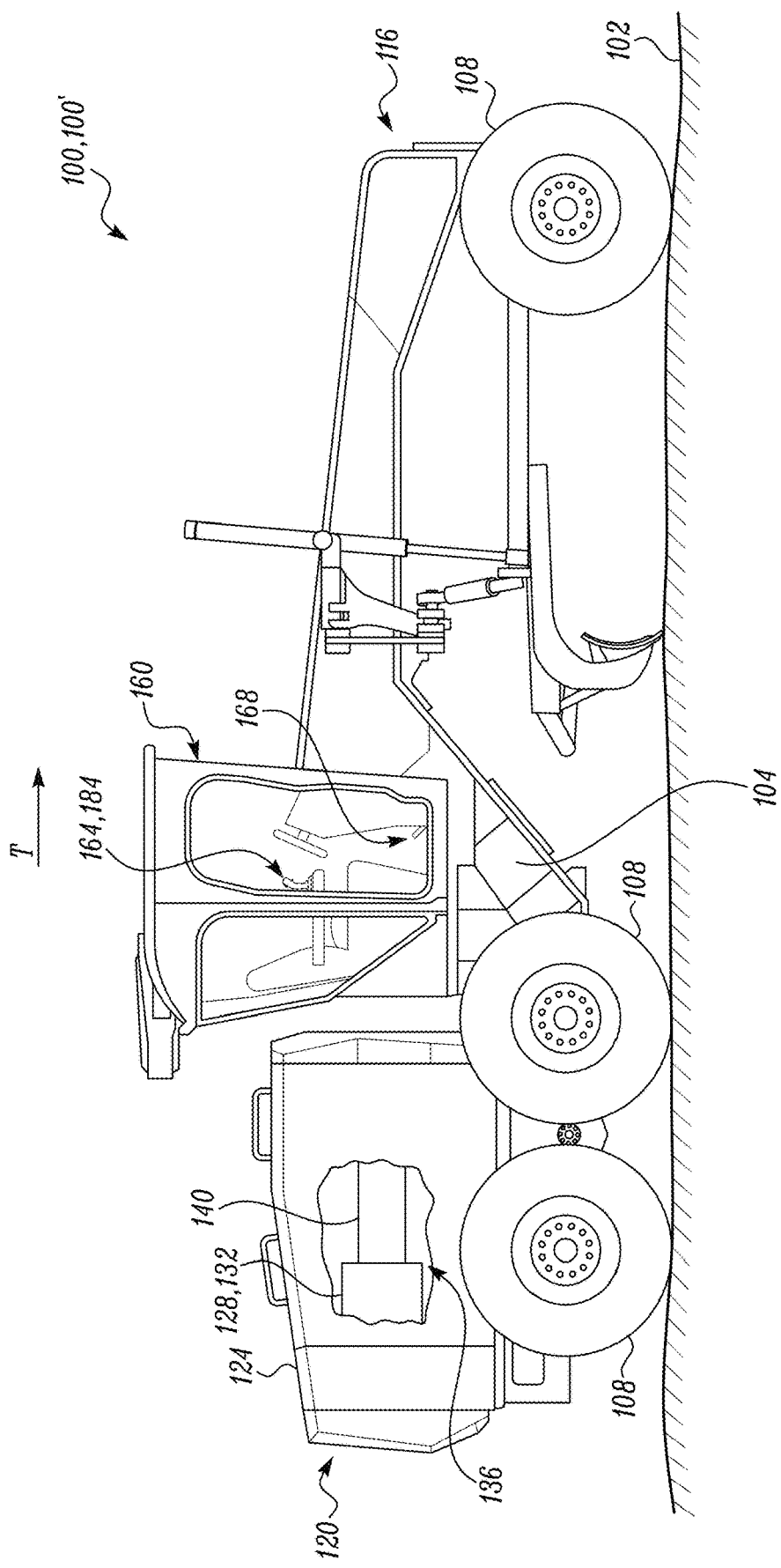
FIG. 1 illustrates an exemplary work machine, in accordance with an embodiment of the present disclosure.

Referring to FIG. 1, an exemplary work machine 100 (hereinafter referred to as "machine 100") is shown. The machine 100 may perform various operations associated with an industry such as construction, mining, farming, transportation, or any other industry known in the art. As an example, the machine 100 is embodied as motor grader 100' configured to perform functions, such as earth altering functions, including displacing, spreading, distributing, leveling, and grading materials, such as soil, over a ground surface or a work surface 102, via one or more implements thereof.

Alternatively, the machine 100 may be any work machine including, but not limited to, a backhoe loader, an excavator, a haul truck, a dozer, a track type tractor, a forklift, a skid steer loader, a multi-terrain loader, and the like. Accordingly, it may be understood that the aspects of the present disclosure are not limited to any particular machine type, and the reference to the machine 100, which is depicted and suggested above as a motor grader, is purely exemplary.

The machine 100 may include a frame 104. The frame 104 may include a rigid structure to which nearly every other component (and/or sub-component) of the machine 100 may be coupled to. Further, the machine 100 may include one or more traction devices 108. Said traction devices 108 may be either in the form of wheels, crawlers, or a combination thereof. The traction devices 108 may be supported on the frame 104. A powering of the traction devices 108 may cause the frame 104 (and thus, the machine 100) to move over a ground surface 102.

Further, the machine 100 may include a forward end 116 and a rearward end 120, as shown. It may be noted that the terms 'forward' and 'rearward', as used herein, in relation to the ends (i.e., the forward end 116 and the rearward end 120), and otherwise, are in relation to an exemplary direction of travel of the machine 100, as represented by arrow, T, in FIG. 1. Said direction of travel is exemplarily defined to extend from the rearward end 120 of the machine 100 towards the forward end 116 of the machine 100, as shown. Understandably, arrow, T, represents a forward direction of the machine 100.

Figure 2:
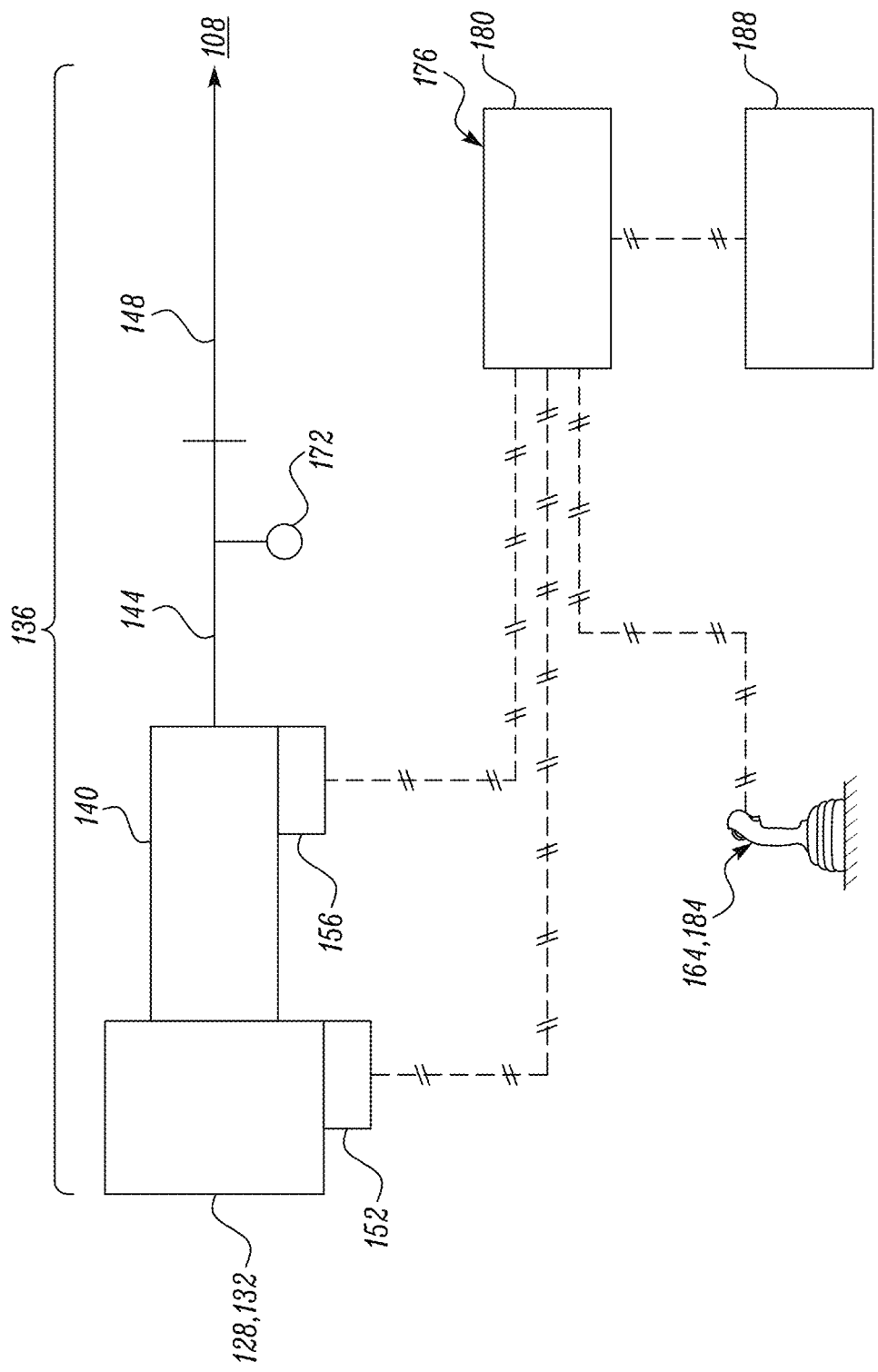
FIG. 2 is a schematic view of a powertrain of the machine depicted in conjunction with a control system and various other parts of the machine, in accordance with an embodiment of the present disclosure.

Referring to FIGS. 1 and 2, the machine 100 may also include several other parts and sub-systems, such as a power compartment 124 that may be supported on the frame 104 and may house a power source 128 of the machine 100. The power source 128 may include an internal combustion engine (or simply an engine 132, hereinafter) for generating power to run the various functions associated with the machine 100. For example, the engine 132 may be part of a powertrain 136 of the machine 100 and may be operably coupled to the traction devices 108 through various other parts of the powertrain 136 in order to power a working of the traction devices 108 and enable the machine 100 attain motion over the ground surface 102. The engine 132 may run on a fuel, such as diesel, gasoline, or natural gas, employed either alone or in combination in the engine 132. Various discussions in the present disclosure reference the engine 132 and its associated components, but all such references related to the engine 132 may be viewed as exemplary, since it is possible for the power source 128 to include suitable equivalents or other types of power generation devices, such as a hybrid power generation device, as well.

The machine 100 may also include a transmission 140 as part of the powertrain 136. The transmission 140 facilitates regulation and transfer of power generated by the engine 132 all the way to the traction devices 108 of the machine 100. Like the power source 128, the transmission 140 may be supported on the frame 104, as well. The transmission 140 may define multiple distinct gears (e.g., a neutral gear, a first forward gear, a fourth forward gear, a second reverse gear, etc.,) (not shown) that may be selectively engaged, via one or more clutches (not shown), to enable the machine 100 attain motion at varying speeds, in both the forward direction (arrow, T) and reverse direction.

The transmission 140 may be adapted to be operably coupled to the power source 128 (e.g., engine 132) to receive power from the power source 128 (e.g., engine 132). Such coupling may be exemplarily attained by selective use of the one or more clutches, such as one or more first clutches, and one or more second clutches (not shown). As an example, if motion in the forward direction in a first forward gear were required, the one or more first clutches may be engaged to bring an input shaft (not shown) of the transmission 140 in operable engagement with an output (e.g., a flywheel) of the engine 132 so that the machine 100 may attain said motion at a first desired speed in the first forward gear, while if a motion in the forward direction in a second forward gear were required, the one or more second clutches may be engaged to bring said input shaft in operable engagement with said output of the engine 132 so that the machine 100 may attain said motion at a second desired speed in the second forward gear, and so on.

Further, the transmission 140 may also include a transmission output shaft 144 through which power output (e.g., rotary power output) received from the power source 128 (e.g., engine 132) may be delivered to further components of the powertrain 136. For example, such power output may be delivered to a propeller shaft 148 of the powertrain 136, that may then further deliver the power output to the traction devices 108 to facilitate machine motion. It will be appreciated that transmission types apart from the one discussed herein may be contemplated. For example, a hydraulic or hybrid transmission may be used, if desired. Further, a layout of the powertrain 136, as illustrated in FIG. 2 and described here is exemplary, as well.

In some embodiments, each of the power source 128 and the transmission 140 may include respective Electronic Control Modules (i.e., ECMs). For example, the power source 128, when including the engine 132, may include an engine ECM 152, and the transmission 140 may include a transmission ECM 156. The engine ECM 152, among other engine related functions, may be configured to regulate a supply of fuel into the engine 132 to power said engine 132. The transmission ECM 156, among other transmission related functions, may be configured to cause the transmission 140 to shift between various gears to cause the machine 100 to acquire different speeds and/or to cause the machine 100 to attain motion in different (i.e., forward or reverse) directions.

Further, with continued reference to both FIGS. 1 and 2, the machine 100 may include an operator cab 160 mounted atop the frame 104. The operator cab 160 may facilitate accommodation and stationing of one or more operators of the machine 100 therein. The operator cab 160 may include various controls and operator interfaces in the form of displays, levers, touchscreen, control panels, joysticks (see joystick 164, FIG. 2), inching pedal 168, and the like, an access to which may enable one or more of the operators of the machine 100 to feed requests or input so as to control the many functions of the machine 100. For example, the operators may control operations of the power source 128 and the transmission 140, by way of access to such controls, so as to in turn facilitate and control machine motion. For example, by access to such controls (e.g., the joystick 164 and the inching pedal 168), one or more operators may request for a transmission shift, for example, from a neutral gear to a desired starting gear. Although various controls (e.g., the joystick 164) have been discussed to be housed within the operator cab 160, optionally, or additionally, such controls may be situated remotely to the machine 100, as well.

Moreover, the machine 100 may also include various sensors. For example, the machine 100 may include a speed sensor 172 that may facilitate detection of a ground speed of the machine 100. For example, the speed sensor 172 may be configured to detect a transmission output speed (e.g., a rotary speed in rotations per minute, RPM) of the transmission output shaft 144, based on which a ground speed of the machine 100 may be deduced (e.g., in real time). Said speed sensor 172 may be communicably coupled to the transmission ECM 156 such that data from the speed sensor 172 may be received by the transmission ECM 156 for processing, storing, etc.

Furthermore, in some embodiments, the machine 100 may include a position sensor (not shown) that may facilitate detection of position of the inching pedal 168. The position sensor may generate signals proportional to the position of the inching pedal 168, which in one embodiment, may be represented as a percentage where 100% is a fully depressed pedal and 0% is a fully extended pedal. It will be understood that in operation, when the inching pedal 168 is 100% depressed, the one or more clutches of the transmission 140 may be moved to disengage the input shaft (not shown) of the transmission 140 with the output (e.g., the flywheel) of the engine 132 to restrict power transfer from the engine 132 to the traction devices 108, while when the inching pedal is 0% depressed (i.e., fully extended), the one or more clutches of the transmission 140 may be moved to engage the input shaft (not shown) of the transmission 140 with the output (e.g., the flywheel) of the engine 132 to facilitate power transfer from the engine 132 to the traction devices 108. Said position sensor may be communicably coupled to the transmission ECM 156 such that data from the position sensor may be received by the transmission ECM 156 for processing, storing, etc.

One or more aspects of the present disclosure relates to a control system 176 of the machine 100 that controls an operation of the engine 132, when a transmission shift to launch (or accelerate) the machine 100 into a desired starting gear, instead of a standard starting gear, is requested. It should be understood that the term "standard starting gear" may be used for the low-speed gears of the transmission 140, upon engagement of which, a driveline load applied on the engine 132 may not exceed a torque capacity of the engine 132 at its minimum idle speed, and the term "desired starting gear" may be used for the high-speed gears (higher than the standard starting gears) of the transmission 140, upon engagement of which, the driveline load applied on the engine 132 may exceed the torque capacity of the engine 132 at its minimum idle speed, resulting in lugging down or stalling the engine 132. Further, it should be noted that the standard starting gears and the desired starting gears may vary depending on the type of the machine 100 (e.g., machine mass), engine configurations (e.g., torque capacities), driveline configurations (e.g., gear ratios), and/or other factors. For example, for the motor grader 100' (as shown in FIG. 1), the standard starting gears may include, both in forward in reverse drive, first gear, second gear, and third gear, whereas the desired starting gear may include any available gear higher than the third gear, such as fourth gear, and so on.

The control system 176 may operate the engine 132 in a manner to facilitate successful launch (or acceleration) of the machine 100 into the requested desired starting gear. To this end, the control system 176 includes a controller 180 that may control a working of the engine 132 in a manner that may facilitate launch or acceleration of the machine 100 into the desired starting gears, without lugging down or stalling the engine 132. In other words, the controller 180 controls a working of the engine 132 such that in response to the request for the transmission shift from the neutral gear to the desired starting gear (higher than the standard starting gears), a minimum speed of the engine 132 is appropriately controlled (e.g., raised, and/or reduced) prior to a completion of the transmission shift from the neutral gear to the desired starting gear. Aspects related to the controller 180 shall be discussed further below.

The controller 180 may be communicably coupled to the ECMs of each of the engine 132 and the transmission 140 (e.g., wirelessly or through suitable data links). For example, the controller 180 may be communicably coupled to the engine ECM 152 and the transmission ECM 156. According to one embodiment of the present disclosure, the controller 180 may function in a closed loop manner with respect to one or more of the engine ECM 152 and the transmission ECM 156, may dynamically (e.g., in real time) determine difference associated with machine motion, and may provide instructions to the engine 132, via its corresponding engine ECM 152, such that machine 100 may be appropriately launched or accelerated into the higher desired starting gear (e.g., fourth forward gear, or fifth forward gear), without lugging down or stalling the engine 132.

Further, the controller 180 may be communicably coupled to one or more of the controls (e.g., the joystick 164). According to an aspect of the present disclosure, the joystick 164 may be an input device 184, access to and/or manipulation of which facilitates the feeding of the input or the request for the transmission shift of the transmission 140. Additionally, the controller 180 may be coupled to a memory unit 188, which may store various/multiple sets of instructions, from which one or more sets of instruction may be accessed and run by the controller 180. In so doing, the controller 180 may control a working of the engine 132 by way of a scheme through which a minimum speed of the engine 132 is controlled (e.g., raised, and/or reduced), and so that the launch (or acceleration) of the machine 100 into the higher desired starting gear may be smoothly executed. A detailed working of the controller 180 by way of the scheme, with some examples, have been set out later in the disclosure.

The controller 180 may be integrated and/or connected to any of the machine's module, such as a safety module or a dynamics module, or may be configured as a stand-alone entity. Optionally, the controller 180 may be integral and be one and the same as any one of the several aforementioned ECMs of the machine 100, as discussed above. In some embodiments, the ECMs (i.e., the engine ECM 152 and the transmission ECM 156) may be integrated together into a single control module entity to define the controller 180. Alternatively, the controller 180 may form part of one or more of the aforesaid ECMs, although it is possible for the controller 180 to stand alone and separate as an altogether different entity.

Exemplarily, the controller 180 may be a microprocessor-based device, and/or may be envisioned as an application-specific integrated circuit, or other logic devices, which provide controller functionality, with such devices being known to those with ordinary skill in the art. In one example, it is possible for the controller 180 to include or be representative of one or more controllers having separate or integrally configured processing units to process a variety of data (or input). Further, the controller 180 may be optimally suited for accommodation within certain machine panels or portions from where the controller 180 may remain accessible for ease of use, service, calibration, and repairs.

In some cases, the controller 180 may be hard-wired to the joystick 164, and to various other components and devices, associated with the machine 100, such as to the ECMs (i.e., the engine ECM 152 and the transmission ECM 156) and to the sensors (i.e., position sensor) of the machine 100. Optionally, the controller 180 may also be deployed at a remote site either in proximity to the joystick 164 or away from the joystick 164.

Processing units, to convert and/or process the signals/data from the joystick 164, the speed sensor 172, the position sensor, etc., may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Examples of the memory unit 188 may include a hard disk drive (HDD), and a secure digital (SD) card. Further, the memory unit 188 may include non-volatile/volatile memory units such as a random-access memory (RAM)/a read only memory (ROM), which include associated input and output buses. The memory unit 188 may be configured to store the set of instructions that may be executable by the controller 180 to execute a method for operating the engine 132 in response to a request for the transmission shift from the neutral gear to the higher desired starting gear, as has been discussed in the present disclosure.

INDUSTRIAL APPLICABILITY

During an exemplary operation, when the machine 100 rests stationary on the ground surface 102, for example, at a road intersection, and when the transmission 140 is in neutral and the engine is operating at its minimum idle speed, an operator(s) of the machine 100 may desire to drive (or launch) the machine 100 through the road intersection at a higher speed. To this end, the operator may request for a transmission shift from the neutral gear to the desired starting gear (e.g., high-speed gear, such as a fourth gear) higher than the standard starting gears (low-speed gears, such as a first gear, a second gear, or a third gear). Upon shifting to such higher desired starting gear from the neutral gear, a surge in the driveline load may be experienced by the engine 132. The engine 132 operating at the minimum idle speed may not produce sufficient power to meet such surge in the driveline load. This may result in engine lugging down or stalling.

The control system 176 of the present disclosure facilitates a control over the working of the engine 132 that helps attain the launch or acceleration of the machine 100 into the desired starting gears (instead of the standard starting gears, or low-speed gears), without lugging down or stalling the engine 132. In other words, the controller 180 controls the working of the engine 132 such that in response to the request for the transmission shift from the neutral gear to the desired starting gear (fourth forward gear), the minimum speed of the engine 132 is appropriately controlled (e.g., raised, and reduced) prior to a completion of the transmission shift from the neutral gear to the desired starting gear.

Figure 3:
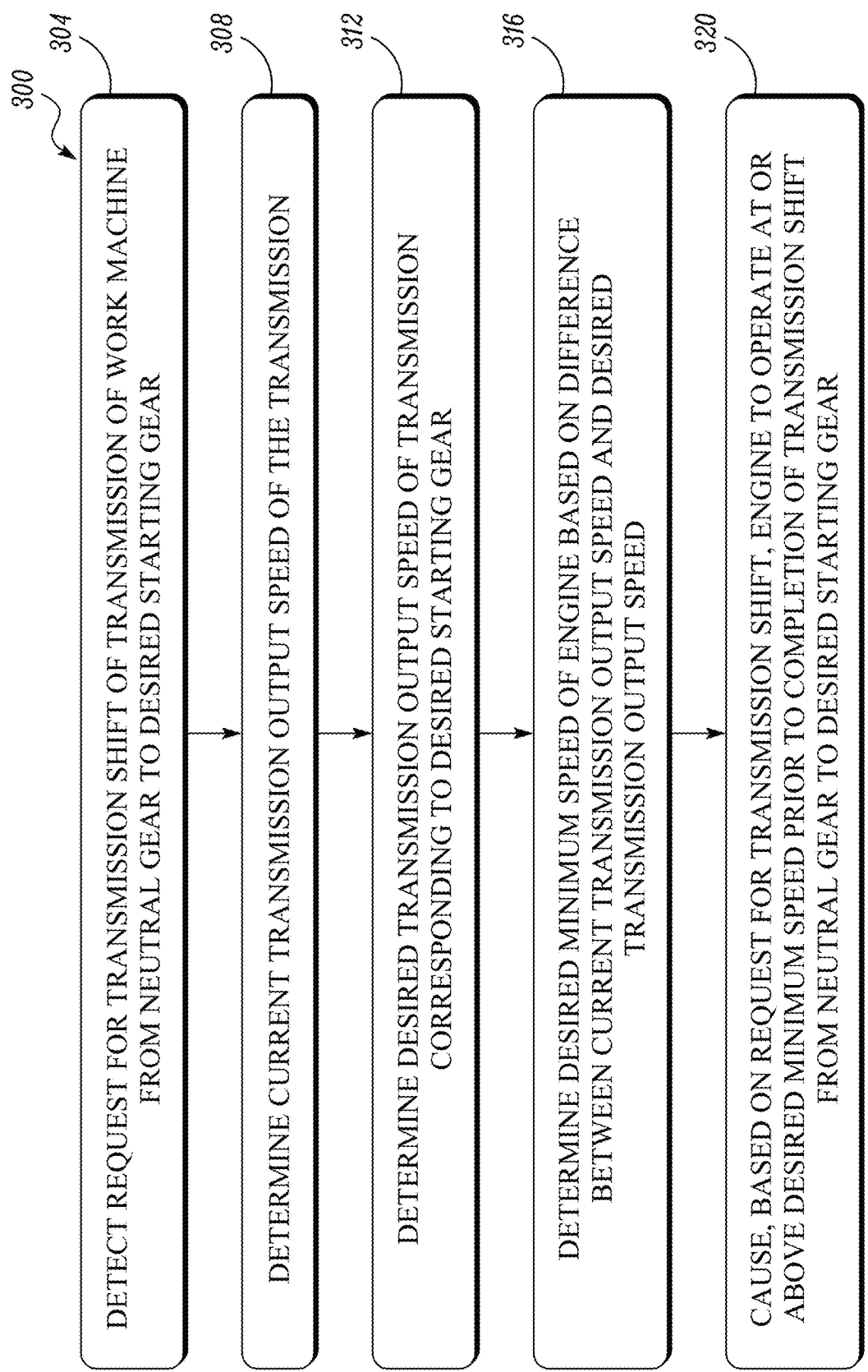
FIG. 3 is a flowchart illustrating a method of operating an engine of the work machine, in accordance with an embodiment of the present disclosure.

Referring to FIG. 3, an operation of the control system 176 for operating the engine 132 of the machine 100 has been explained by way of an exemplary method. Said method is illustrated and discussed by way of a flowchart 300 as shown in FIG. 3, and is discussed also in conjunction with FIGS. 1, 2 and 4. The method starts at step 304.

Figure 4:
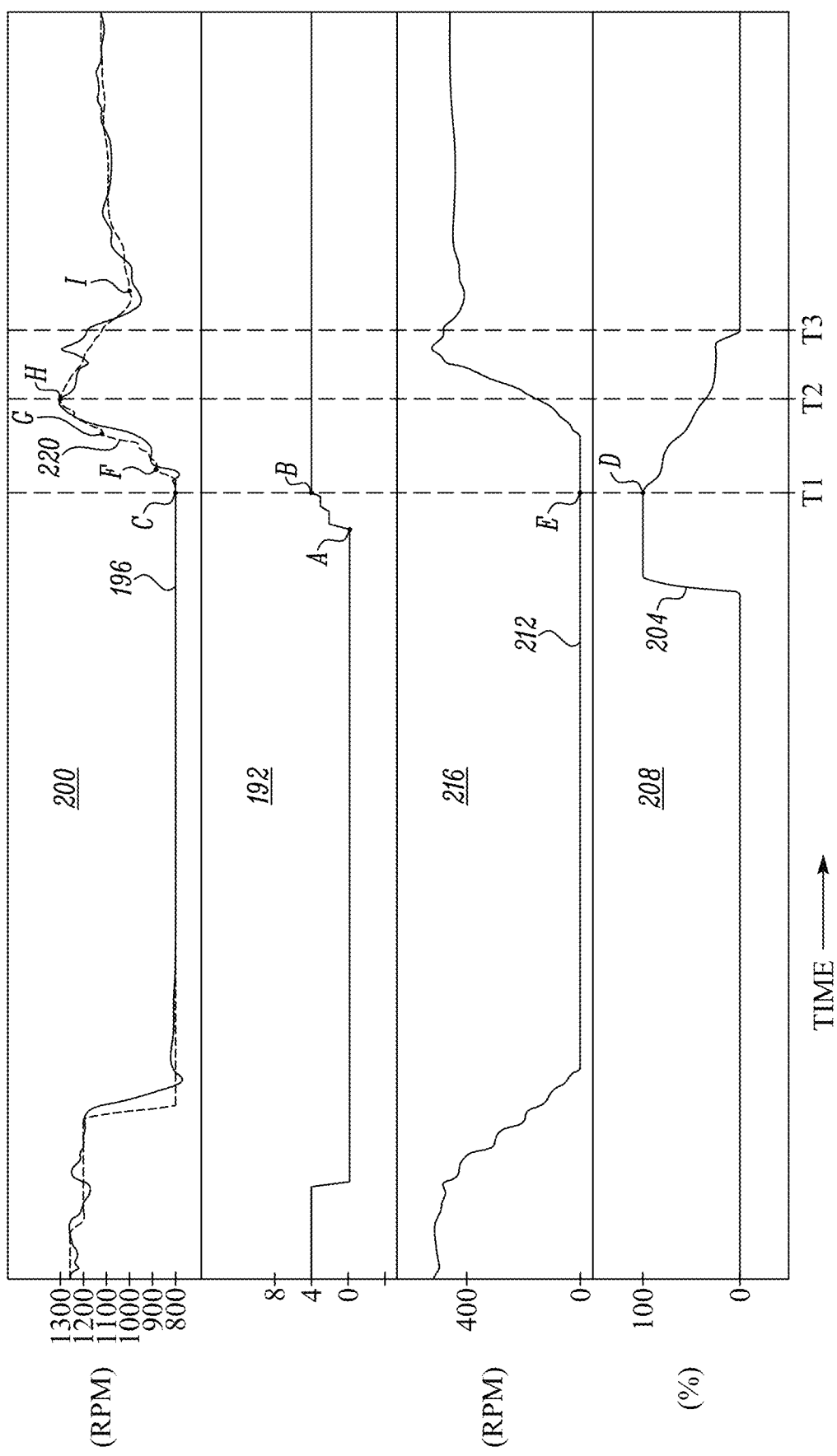
FIG. 4 illustrates plots of (a) engine speed versus time; (b) selected gear versus time; (c) transmission output speed versus time; and (d) inching pedal position versus time, in accordance with an embodiment of the present disclosure.

At step 304, when the machine 100 rests stationary at the road intersection, the transmission 140 is in neutral, and the engine is operating at its minimum idle speed, an operator of the machine 100 may desire to drive (or launch) the machine 100 through the road intersection at a high speed. To this end, the operator may request for a transmission shift from the neutral gear to the desired starting gear (e.g., fourth forward gear) (see a curve A-B of selected gear versus time plot 192, in FIG. 4). Said request may be fed through the input device 184 (e.g., the joystick 164). Since the controller 180 may be in operable communication with the input device 184, the controller 180 may detect such a request. As shown in FIG. 4, at this stage (i.e., at time T1), the engine 132 is running at about 800 RPM (see point C on an engine speed curve (shown as a solid curve 196) of an engine speed versus time plot 200, in FIG. 4), and the inching pedal 168 is at 100% depressed position (see point D on a curve 204 of inching pedal position versus time plot 208, in FIG. 4) to disengage the engine 132 from the transmission 140. As used herein, the term "about" may refer to a value that is "within engineering tolerances". For example, about 800 RPM may mean between 780 RPM and 820 RPM, and so on, except where otherwise indicated.

In response to the request for the transmission shift, the controller 180 may determine a current transmission output speed of the transmission output shaft 144 (of the transmission 140), at step 308, and may determine a desired transmission output speed of the transmission output shaft 144 corresponding to the selected desired starting gear, at step 312.

To determine the current transmission output speed of the transmission output shaft 144, the controller 180 may retrieve data related to a speed (e.g., a rotary speed, in RPM) of the transmission output shaft 144 either from the speed sensor 172 or from the transmission ECM 156 that may be in communication with the speed sensor 172. In an example, at this stage (i.e., at time T1), the controller 180 may determine the current transmission output speed of the engine 132 to be zero (see point E on a curve 212 in transmission output speed versus time plot 216, in FIG. 4).

To determine the desired transmission output speed of the transmission output shaft 144 corresponding to the selected desired starting gear, the controller 180 may retrieve data related to a speed (e.g., a rotary speed, in RPM) of the transmission output shaft 144 from the memory unit 188. For example, upon detection of the transmission shift from the neutral gear to the fourth forward gear, the controller 180 may utilize a look-up table (pre-stored in the memory unit 188 of the controller 180) to determine the desired transmission output speed to be about 400 RPM. In some embodiments, the controller 180 may receive the desired transmission output speed data from the transmission ECM 156.

The controller 180 may compare the current transmission output speed and the desired transmission output speed to deduce a difference between the current transmission output speed and the desired transmission output speed. Based on the difference between the current transmission output speed and the desired transmission output speed, the controller 180 may determine a desired minimum speed of the engine 132, at step 316. In an example, if the difference between the current transmission output speed and the desired transmission output speed is lower than a threshold (pre-stored in the memory unit 188 of the controller 180), the controller 180 may determine a desired minimum speed equal to a current minimum idle speed (e.g., about 800 RPM) (pre-stored in the memory unit 188 of the controller 180) of the engine 132.

If the difference between the current transmission output speed and the desired transmission output speed is higher than the threshold, the controller 180 may determine a desired minimum speed higher than the current minimum idle speed of the engine 132. That is, upon determining that the current transmission output speed is much lower than the desired transmission output speed, and that the engine 132 running at the current minimum idle speed may not produce power sufficient enough to propel the machine 100 at the desired transmission output speed upon completion of the transmission shift, the controller 180 may determine the desired minimum speed higher than the current minimum idle speed, and accordingly, elevate the minimum speed from the current minimum idle speed to the desired minimum speed. In an example, as shown in FIG. 4 via a dashed curve 220 (indicating the desired speed of the engine 132) in the engine speed versus time plot 200, the controller 180 may elevate the minimum speed of the engine 132 from a current value of about 800 RPM (current minimum idle speed) to a relatively higher value of desired minimum speed, for example, to about 900 RPM (see point F in the dashed curve 220).

Once the minimum speed is elevated to the desired minimum speed, the controller 180 may cause the engine 132 to operate at or above the desired minimum speed (e.g., at or above 900 RPM) prior to completion of the transmission shift from the neutral gear to the desired starting gear (e.g., fourth gear), at step 320. To this end, the controller 180 may instruct the engine 132 (e.g., by way of the engine ECM 152) to increase quantity of fuel supply to a level such that an output speed of the engine 132 may be raised and maintained at or above the desired minimum speed (e.g., 900 RPM). The controller 180 may perform the steps 308-320 in a same period in which the one or more clutches begin to move from fully disengaged position (e.g., when the inching pedal 168 is at the 100% depressed position, i.e., at point D) (for disengaging the engine 132 and the transmission 140) towards the fully engaged (or locked-up) position (e.g., when the inching pedal 168 is at 0% depressed position) (for engaging the engine 132 and the transmission 140).

The controller 180 may elevate the minimum speed of the engine 132 from the current minimum idle speed to the desired minimum speed at an elevation rate proportional to the difference between the current transmission output speed and the desired transmission output speed. That is, the larger the difference between the current transmission output speed and the desired transmission output speed, the higher the elevation rate. The elevation rate may define how quickly the minimum speed may rise from the current minimum idle speed to the desired minimum speed. The elevation rate may be defined in terms of engine speed (RPM) per second. Further, the controller 180 may limit the elevation rate of the minimum speed below a predefined elevation rate, for example, to eliminate any sudden spike in the engine speed, and improve the drivability of the machine 100. The predefined elevation rate may be pre-stored in the memory unit 188 of the controller 180, or alternatively, it may be input by the operator.

Further, the controller 180 may repeat the steps 308-320 until the ground speed of the machine 100 starts increasing (e.g., until the machine 100 starts moving from rest). In other words, the controller 180 may further elevate the desired minimum speed of the engine 132 from its current value to a relatively higher value, and may cause the engine 132 to operate at or above the relatively higher value of the desired minimum speed. For example, upon determining that the engine 132 operating at the desired minimum speed (e.g., about 900 RPM) may not provide power (torque) sufficient to propel the machine 100 (from rest), the controller 180 may further elevate the minimum speed of the engine 132 from its current value (e.g., about 900 RPM) of the desired minimum speed to a relatively higher value (e.g., about 1100 RPM) (see point G, in the dashed curve 220) of the desired minimum speed, and cause the engine 132 to operate at or above that relatively higher value of the desired minimum speed.

The controller 180 may continue to further elevate the desired minimum speed until the machine 100 starts moving from rest. For example, as shown in FIG. 4, the controller 180 may detect movement of the machine 100 (from rest) (at time T2) in response to causing the engine 132 to operate at or above 1300 RPM (elevated value of the desired minimum speed) (see point H, in the dashed curve 220). From point H, the controller 180 may not further elevate the desired minimum speed to values higher than 1300 RPM.

Once the machine 100 starts moving (accelerating) from rest (i.e., at time T2), the controller 180 may reduce the minimum speed of the engine 132 from its current value of the desired minimum speed (i.e., 1300 RPM, point H), for example, to equalize with an operator-requested engine speed (i.e., engine speed corresponding to throttle pedal position, e.g., 1000 RPM) (see point I, in the dashed curve 220). The controller 180 may reduce the minimum speed of the engine 132 from the desired minimum speed to equalize with the operator-requested engine speed prior to the completion of the requested transmission shift, to avoid any engine speed overshoot conditions that may create undesired acceleration or the jerking motion during the launch of the machine 100.

The controller 180 may reduce the minimum speed from the desired minimum speed to an operator-requested engine speed at a reduction rate. The reduction rate may define how quickly the minimum speed may be lowered from the desired minimum speed to the operator-requested engine speed. The reduction rate may be defined in terms of engine speed (RPM) per second. The controller 180 may set the reduction rate based on a difference between the desired minimum speed and the operator-requested engine speed, and/or time period left to complete the requested transmission shift, i.e., difference between time periods T2 and T3 (time at which the inching pedal attains 0% depressed position to fully engage the engine 132 and the transmission 140). The controller 180 may limit the reduction rate of the minimum speed below a predefined reduction rate. The predefined reduction rate may be pre-stored in the memory unit 188 of the controller 180, or alternatively, it may be input by the operator.

Because the control system 176 facilitates a control over the minimum speed of the engine 132 when launching (or accelerating) the machine 100 (from rest) directly into the high-speed gears rather than standard starting gears, as aforementioned, the output speed of the engine 132 is sufficiently raised to the desired minimum speed at which the engine 132 may provide sufficient power (torque) to propel the machine 100 into the selected high-speed gear, prior to the completion of the transmission shift into that selected high-speed gear, and hence, may not stall or lug. Also, the control system 176 facilitates reduction of the minimum speed, for example, to equalize with the operator-requested engine speed, once the machine starts moving, prior to the completion of the transmission shift. This is to avoid any engine speed overshoot conditions that may create undesired acceleration or the jerking motion during the launch of the machine 100.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the control system, the work machine, and/or the method of the present disclosure without departing from the scope of the disclosure. Other embodiments will be apparent to those skilled in the art from consideration of the specification and practice of the control system, the work machine, and/or the method disclosed herein. It is intended that the specification and examples be considered as exemplary only, with a true scope of the disclosure being indicated by the following claims and their equivalent.

What is claimed is:

1. A method of operating an engine of a work machine via a controller, the method comprising:
   detecting a request for a transmission shift of a transmission of the work machine from a neutral gear to a desired starting gear;
   determining a current transmission output speed of the transmission;
   determining a desired transmission output speed of the transmission corresponding to the desired starting gear;
   determining a desired minimum speed of the engine based on a difference between the current transmission output speed and the desired transmission output speed; and
   causing, based on the request for the transmission shift, the engine to operate at or above the desired minimum speed prior to a completion of the transmission shift from the neutral gear to the desired starting gear.

2. The method of claim 1 further including:
   elevating a minimum speed of the engine from a current minimum idle speed to the desired minimum speed if the current transmission output speed is lower than the desired transmission output speed.

3. The method of claim 2, wherein the minimum speed is elevated from the current minimum idle speed to the desired minimum speed at an elevation rate proportional to the difference between the current transmission output speed and the desired transmission output speed.

4. The method of claim 3 further including:
   limiting the elevation rate of the minimum speed below a predefined elevation rate.

5. The method of claim 3 further including:
   reducing the minimum speed of the engine from the desired minimum speed to an operator-requested engine speed once the machine starts moving from rest.

6. The method of claim 5, wherein the minimum speed is reduced from the desired minimum speed to the operator-requested engine speed at a reduction rate, and wherein the method includes:
   limiting the reduction rate of the minimum speed below a predefined reduction rate.

7. The method of claim 2, wherein the desired starting gear corresponds to a gear upon engagement of which a driveline load applied on the engine exceeds a torque capacity of the engine at the current minimum idle speed.

8. A work machine, comprising:
   an engine;
   a transmission operably coupled to the engine to transfer power to one or more traction devices of the work machine to facilitate machine motion; and
   a control system for operating the engine, the control system including:
     a controller configured to:
       detect a request for a transmission shift of the transmission from a neutral gear to a desired starting gear;
       determine a current transmission output speed of the transmission;
       determine a desired transmission output speed of the transmission corresponding to the desired starting gear; and
       determine a desired minimum speed of the engine based on a difference between the current transmission output speed and the desired transmission output speed; and
       cause, based on the request for the transmission shift, the engine to operate at or above the desired minimum speed prior to a completion of the transmission shift from the neutral gear to the desired starting gear.

9. The work machine of claim 8, wherein the controller is configured to:
   elevate a minimum speed of the engine from a current minimum idle speed to the desired minimum speed if the current transmission output speed is lower than the desired transmission output speed.

10. The work machine of claim 9, wherein the controller elevates the minimum speed from the current minimum idle speed to the desired minimum speed at an elevation rate proportional to the difference between the current transmission output speed and the desired transmission output speed.

11. The work machine of claim 10, wherein the controller is configured to:
    limit the elevation rate of the minimum speed below a predefined elevation rate.

12. The work machine of claim 10, wherein the controller is configured to:
    reduce the minimum speed of the engine from the desired minimum speed to an operator-requested engine speed once the machine starts moving from rest.

13. The work machine of claim 12, wherein the controller reduces the minimum speed from the desired minimum speed to the operator-requested engine speed at a reduction rate lower than a predefined reduction rate.

14. The work machine of claim 9, wherein the desired starting gear corresponds to a gear upon engagement of which a driveline load applied on the engine exceeds a torque capacity of the engine at the current minimum idle speed.

15. A control system for operating an engine of a work machine, the control system comprising:
a controller configured to:
  detect a request for a transmission shift of a transmission of the work machine from a neutral gear to a desired starting gear;
  determine a current transmission output speed of the transmission;
  determine a desired transmission output speed of the transmission corresponding to the desired starting gear;
  determine a desired minimum speed of the engine based on a difference between the current transmission output speed and the desired transmission output speed; and
  cause, based on the request for the transmission shift, the engine to operate at or above the desired minimum speed prior to a completion of the transmission shift from the neutral gear to the desired starting gear.

16. The control system of claim 15, wherein the controller is configured to:
  elevate a minimum speed of the engine from a current minimum idle speed to the desired minimum speed if the current transmission output speed is lower than the desired transmission output speed,
  wherein the controller elevates the minimum speed from the current minimum idle speed to the desired minimum speed at an elevation rate proportional to the difference between the current transmission output speed and the desired transmission output speed.

17. The control system of claim 16, wherein the controller is configured to:
  limit the elevation rate of the minimum speed below a predefined elevation rate.

18. The control system of claim 16, wherein the controller is configured to:
  reduce the minimum speed of the engine from the desired minimum speed to an operator-requested engine speed once the machine starts moving from rest.

19. The control system of claim 18, wherein the controller reduces the minimum speed from the desired minimum speed to the operator-requested engine speed at a reduction rate lower than a predefined reduction rate.

20. The control system of claim 16, wherein the desired starting gear corresponds to a gear upon engagement of which a driveline load applied on the engine exceeds a torque capacity of the engine at the current minimum idle speed.

* * * * *